(12) United States Patent
Subhaschandra et al.

(10) Patent No.: US 10,528,768 B2
(45) Date of Patent: Jan. 7, 2020

(54) METHODS AND APPARATUS TO PROVIDE USER-LEVEL ACCESS AUTHORIZATION FOR CLOUD-BASED FIELD-PROGRAMMABLE GATE ARRAYS

(71) Applicant: Intel Corporation, Santa Clara, CA (US)

(72) Inventors: Suchit Subhaschandra, Hillsboro, OR (US); Srivatsan Krishnan, Hillsboro, OR (US); Brent Thomas, Chandler, AZ (US); Pratik Marolia, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 175 days.

(21) Appl. No.: 15/706,180

(22) Filed: Sep. 15, 2017

(65) Prior Publication Data
US 2019/0087606 A1    Mar. 21, 2019

(51) Int. Cl.
*H04L 29/06* (2006.01)
*G06F 21/76* (2013.01)
*G06F 21/31* (2013.01)

(52) U.S. Cl.
CPC ............. *G06F 21/76* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 7,373,668 B1* | 5/2008 | Trimberger | ......... | G06F 12/1425 |
| | | | | 711/E12.099 |
| 2002/0199110 A1* | 12/2002 | Kean | ................... | G06F 17/5054 |
| | | | | 713/189 |
| 2006/0059345 A1* | 3/2006 | Fayad | ..................... | G06F 21/72 |
| | | | | 713/173 |
| 2010/0017608 A1* | 1/2010 | Larsen | ................... | H04L 41/12 |
| | | | | 713/168 |
| 2012/0102333 A1* | 4/2012 | Wong | ...................... | G06F 21/10 |
| | | | | 713/189 |
| 2014/0043059 A1* | 2/2014 | Speers | ................. | H03K 19/003 |
| | | | | 326/9 |
| 2016/0248588 A1* | 8/2016 | Langhammer | ........ | H04L 9/3242 |
| 2018/0088174 A1* | 3/2018 | Davis | ............... | G01R 31/31705 |
| 2018/0139110 A1* | 5/2018 | Johnson | .............. | H04L 41/5054 |
| 2019/0073473 A1* | 3/2019 | VanderLeest | ......... | G06F 21/554 |

* cited by examiner

*Primary Examiner* — Taghi T Arani
*Assistant Examiner* — Lin Chang
(74) *Attorney, Agent, or Firm* — Hanley, Flight & Zimmerman, LLC

(57) ABSTRACT

Methods and apparatus to provide user-level access authorization for cloud-based filed-programmable gate arrays are disclosed. An example apparatus includes a field-programmable gate array (FPGA) including a first memory and a second memory different from the first memory. The first memory stores a bitstream. The second memory stores a first user tag associated with the bitstream. The example apparatus further includes a kernel having an FPGA driver operatively coupled to the FPGA. The FPGA driver is to receive a command associated with accessing the FPGA from a user-executed application. The FPGA driver is further to identify a second user tag associated with the command. The FPGA driver is further to determine whether the command is to be accepted based on the second user tag.

20 Claims, 7 Drawing Sheets

US 10,528,768 B2

METHODS AND APPARATUS TO PROVIDE USER-LEVEL ACCESS AUTHORIZATION FOR CLOUD-BASED FIELD-PROGRAMMABLE GATE ARRAYS

FIELD OF THE DISCLOSURE

This disclosure relates generally to field-programmable gate arrays and, more specifically, to methods and apparatus to provide user-level access authorization for cloud-based field programmable gate arrays.

BACKGROUND

Field-programmable gate arrays (FPGAs) are commonly implemented as special-purpose computational accelerators and/or special-purpose functional units capable of performing one or more computational operation(s) and/or function (s) based on a bitstream loaded into and/or stored on the FPGA. In instances in which an FPGA is implemented in a cloud computing environment, the bitstream may be programmed and/or configured by an authorized and/or licensed user of the FPGA via a partial reconfiguration controller located in a kernel space of the cloud computing environment. The partial reconfiguration controller loads the programmed and/or configured bitstream into a configuration memory of the FPGA where the bitstream is thereafter stored (e.g., temporarily stored via random access memory).

Figure 1:
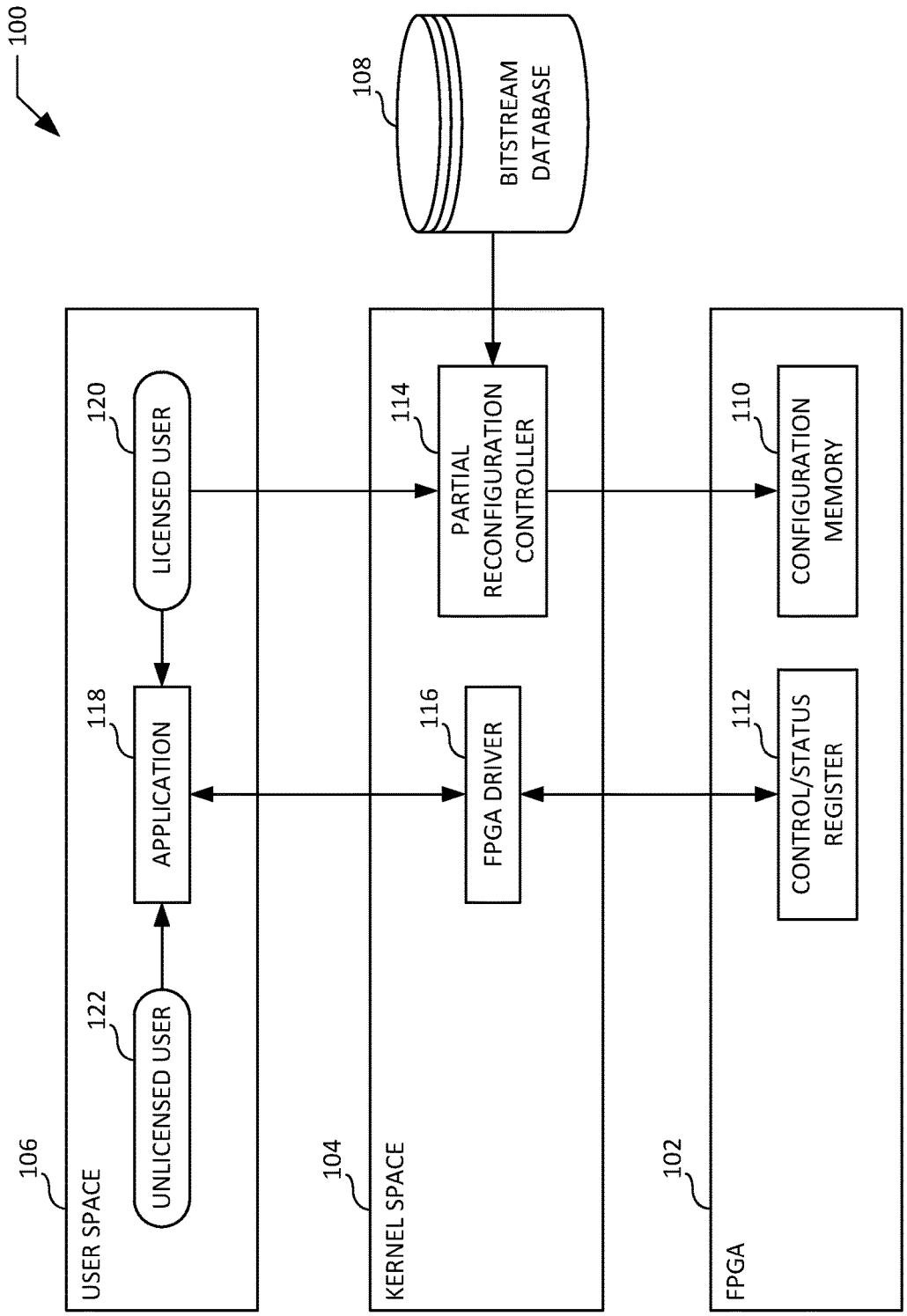
FIG. 1 is a block diagram of a known cloud computing environment including a known FPGA.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

When FPGAs are implemented in cloud computing environments, a bitstream to be loaded into and/or stored on a particular FPGA may be programmed and/or configured by an authorized and/or licensed user of the particular FPGA via a partial reconfiguration controller located in a kernel space of the cloud computing environment. The partial reconfiguration controller loads the programmed and/or configured bitstream into a configuration memory of the FPGA where the bitstream is thereafter stored (e.g., temporarily stored via random access memory).

FPGA bitstreams do not include user-level data and/or information. Programmed and/or configured FPGAs implemented in known cloud computing environments are therefore accessible to and/or usable by any user having access (e.g., regardless of whether such access is authorized or not authorized) to a host computer (e.g., physical or virtual) or an application binary that generates one or more command (s) requesting and/or calling for access to and/or use of the programmed and/or configured FPGA (e.g., a system call requesting access to and/or use of the bitstream and/or an associated accelerator functional unit of the FPGA).

In contrast to the conventional methods and apparatus for implementing cloud-based FPGAs described above, the example methods and apparatus disclosed herein advantageously provide user-level access authorization for cloud-based FPGAs. The disclosed methods and apparatus advantageously reduce (e.g., limit and/or prevent) the possibility of an unauthorized and/or unlicensed user accessing and/or using a cloud-based FPGA that has been programmed and/or configured based on a licensed bitstream. The disclosed methods and apparatus accordingly provide increased protection to vendors' rights and/or developers' rights in licensed bitstreams loaded into cloud-based FPGAs. Such increased protection encourages the continued adoption and implementation of cloud-based FPGAs as computational accelerators. Before describing the details of the disclosed methods and apparatus to provide user-level access authorization for cloud-based FPGAs, a description of a known cloud computing environment including a known FPGA is provided below in connection with FIG. 1.

As used herein, the term "licensed user" refers to a user that is authorized and/or licensed to program, configure, select and/or otherwise develop a bitstream to be loaded into a particular cloud-based computational accelerator (e.g., a cloud-based FPGA). In contrast, the term "unlicensed user" as used herein refers to a user that is not authorized and/or licensed to program, configure, select and/or otherwise develop a bitstream to be loaded into the particular cloud-based computational accelerator. As used herein, the term "licensed bitstream" refers to a bitstream that is programmed, configured, selected and/or otherwise developed at the direction of (e.g., based on one or more input(s), selection(s), instruction(s) and/or command(s) provided by) a licensed user. As used herein, the term "user tag" refers to data and/or information associated with a user and/or a group of users that identifies (e.g., uniquely identifies) the user and/or the group of users. As used herein, the term "licensed user tag" refers to a user tag that is associated with a licensed user and/or a licensed bitstream.

FIG. 1 is a block diagram of a known cloud computing environment 100 including a known FPGA 102. The cloud computing environment 100 of FIG. 1 also includes a kernel space 104, a user space 106, and a bitstream database 108. The FPGA 102 of FIG. 1 includes a configuration memory 110 and a control/status register 112. The kernel space 104 of FIG. 1 includes a partial reconfiguration controller 114 and an FPGA driver 116. The user space 106 of FIG. 1 includes an application 118, a licensed user 120, and an unlicensed user 122.

The FPGA 102 of FIG. 1 is a computational accelerator that may be programmed and/or configured to perform one or more computational operation(s) and/or function(s) based on a licensed bitstream loaded into the configuration memory 110 of the FPGA 102 of FIG. 1. The configuration memory 110 of FIG. 1 stores the licensed bitstream. The configuration memory 110 of FIG. 1 is implemented as random access memory having write-only access (e.g., write-only random access memory). Thus, the licensed bitstream stored in the configuration memory 110 of FIG. 1 is not readable from the configuration memory 110.

In the illustrated example of FIG. 1, the licensed bitstream to be stored in the configuration memory 110 of the FPGA 102 is loaded into the configuration memory 110 via the partial reconfiguration controller 114 of the kernel space 104 of FIG. 1. The partial reconfiguration controller 114 of FIG. 1 generates and/or identifies the licensed bitstream based on one or more input(s), selection(s), instruction(s) and/or command(s) provided to the partial reconfiguration controller 114 by the licensed user 120 of the user space 106 of FIG. 1. The input(s), selection(s), instruction(s) and/or command (s) provided by the licensed user 120 of FIG. 1 may include an identification and/or selection of a bitstream (e.g., a base bitstream that may or may not be modifiable by the licensed user 120) that is accessible to the licensed user 120 from the bitstream database 108 of FIG. 1 via the partial reconfiguration controller 114 of FIG. 1. Bitstreams available via the bitstream database 108 of FIG. 1 may be based on vendor-specific proprietary tools that enable the generation of design binaries for the bitstreams. The licensed user 120 of FIG. 1 is authorized to program, configure, select, develop and/or otherwise make use of the licensed bitstream to be loaded into the FPGA 102 of FIG. 1. In contrast, the unlicensed user 122 of FIG. 1 is not authorized to program, configure, select, develop and/or otherwise make use of the licensed bitstream to be loaded into the FPGA 102 of FIG. 1.

Subsequent to the FPGA 102 of FIG. 1 being programmed and/or configured via the above-described licensed bitstream, one or more users of the user space 106 of FIG. 1 may attempt to access and/or use the FPGA 102 via the application 118 of the user space 106 of FIG. 1. For example, either of the licensed user 120 or the unlicensed user 122 of FIG. 1 may execute the application 118 of FIG. 1. When executed by either of the licensed user 120 or the unlicensed user 122, the application 118 of FIG. 1 generates one or more command(s) that request(s) and/or call(s) for access to and/or use of the FPGA 102 of FIG. 1. The application 118 of FIG. 1 sends the FPGA-related access and/or use command(s) to the FPGA driver 116 of the kernel 104 of FIG. 1. The FPGA driver 116 of FIG. 1 send(s) the FPGA-related access and/or use command(s) received from the application 118 of FIG. 1 to the control/status register 112 of the FPGA 102 of FIG. 1.

The control/status register 112 of FIG. 1 provides an interface between the FPGA 102 and the FPGA driver 116 of FIG. 1. The control/status register 112 also facilitates access to and/or use of the FPGA 102 of FIG. 1 for the purpose of implementing one or more computational operation(s) and/or function(s) associated with the licensed bitstream stored in the configuration memory 110 of the FPGA 102 of FIG. 1. For example, the control/status register 112 of FIG. 1 facilitates access to and/or use of the FPGA 102 by a user (e.g., the licensed user 120 or the unlicensed user 122 of FIG. 1) executing the application 118 of FIG. 1 in response to the FPGA-related access and/or use command(s) received from the FPGA driver 116 of the kernel space 104 of FIG. 1.

In the illustrated example of FIG. 1, the control/status register 112 of FIG. 1 facilitates access and/or use of the FPGA 102 of FIG. 1 without consideration as to whether a user associated with the application 118 and/or the above-described FPGA-related access and/or use command(s) is an unlicensed user versus a licensed user (e.g., without implementing a user-level access authorization process associated with access to and/or use of the FPGA 102). The licensed user 120 and the unlicensed user 122 are therefore both able to access and/or use the FPGA 102 of FIG. 1 via the application 118 of FIG. 1, even though only the licensed user 120 is authorized to do so.

Figure 2:
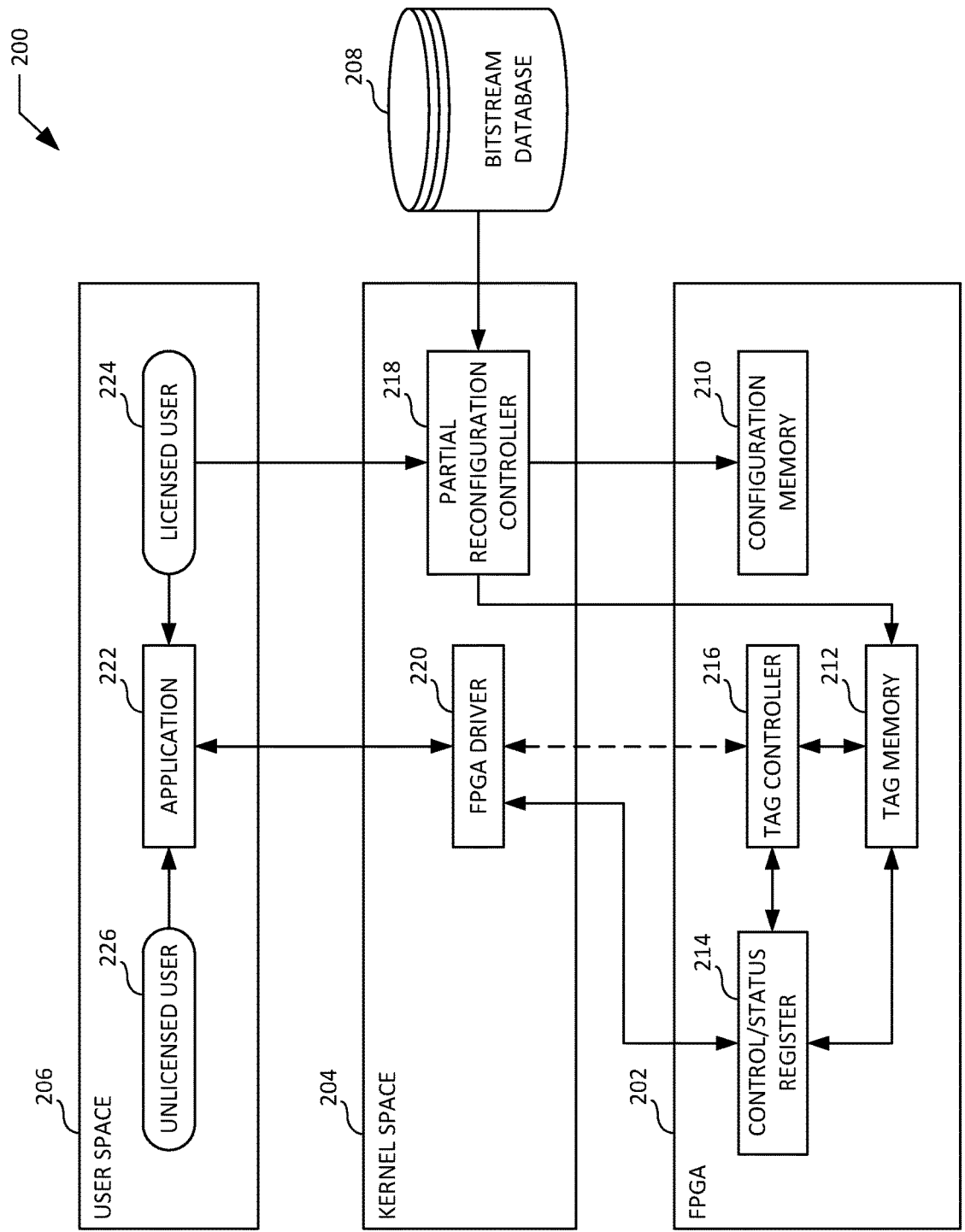
FIG. 2 is a block diagram of an example cloud computing environment including an example FPGA constructed in accordance with the teachings of this disclosure.

Unlike the known cloud computing environment 100 including the known FPGA 102 of FIG. 1 described above, the disclosed methods and apparatus provide user-level access authorization for cloud-based FPGAs. FIG. 2 is a block diagram of an example cloud computing environment 200 including an example FPGA 202 constructed in accordance with the teachings of this disclosure. The example cloud computing environment 200 of FIG. 2 also includes an example kernel space 204, an example user space 206, and an example bitstream database 208. The example FPGA 202 of FIG. 2 includes an example configuration memory 210, an example tag memory 212, an example control/status register 214, and an example tag controller 216. The example kernel space 204 of FIG. 2 includes an example partial reconfiguration controller 218 and an example FPGA driver 220. The example user space 206 of FIG. 2 includes an example application 222, an example licensed user 224, and an example unlicensed user 226.

The example FPGA 202 of FIG. 2 is a computational accelerator that may be programmed and/or configured to perform one or more computational operation(s) and/or function(s) based on a licensed bitstream loaded into the example configuration memory 210 of the FPGA 202 of FIG. 2. The example configuration memory 210 of FIG. 2 stores the licensed bitstream. In some examples, the configuration memory 210 of FIG. 2 may be implemented as random access memory having write-only access (e.g., write-only random access memory). In such examples, the licensed bitstream stored in the configuration memory 210 of FIG. 2 is not readable from the configuration memory 210.

For example, the configuration memory 210 of FIG. 2 may be implemented as random access memory for programming the behavior of lookup tables, memories, digital signal processors, interconnects, etc. associated with the FPGA 202 of FIG. 2. In some examples, the configuration memory 210 of FIG. 2 may have write access that allows for bitstream load flow only, such that the configuration memory 210 cannot be written by soft logic on the FPGA 202 of FIG. 2. In some examples, the write access of the configuration memory 210 of FIG. 2 may be write-only access, such that the configuration memory 210 cannot be read. In some examples, the configuration memory 210 of FIG. 2 is not visible to users, and accordingly cannot be instantiated via user accelerators.

The example tag memory 212 of FIG. 2 stores one or more licensed user tag(s) associated with the licensed bitstream loaded into and/or stored in the configuration memory 210 of FIG. 2. In some examples, respective ones of the licensed user tag(s) stored in the tag memory 212 of FIG. 2 may include one or more user identifier(s). In some such examples, the respective ones of the licensed user tag(s) may additionally include access control metadata associated with the user identifier(s). In some examples, the tag memory 212 of FIG. 2 may be implemented as random access memory having read-write access (e.g., read-write random access memory). In such examples, the licensed user tag(s) stored in the tag memory 212 of FIG. 2 is/are readable from the tag memory 212.

For example, in contrast to the configuration memory 210 of FIG. 2 that may be implemented as random access memory for configuring programmable logic associated with the FPGA 202 of FIG. 2, the tag memory 212 of FIG. 2 may be implemented as random access memory that is not used for configuring such programmable logic, but is instead used and/or reserved for storing licensed user tag(s) and associated access control metadata. In some examples, the tag memory 212 of FIG. 2 may have write access that allows for bitstream load flow only, such that the tag memory 212 cannot be written by soft logic on the FPGA 202 of FIG. 2. In some examples, the write access of the tag memory 212 of FIG. 2 may be read-write access, such that the tag memory 210 can be read by soft logic on the FPGA using an atom or, alternatively, via a Joint Test Action Group (JTAG) controller. In some examples, the tag memory 212 of FIG. 2 is not visible to users, and accordingly cannot be instantiated via user accelerators.

In the illustrated example of FIG. 2, the licensed bitstream to be stored in the example configuration memory 210 of the example FPGA 202 of FIG. 2 is loaded into the configuration memory 210 via the example partial reconfiguration controller 218 of the example kernel space 204 of FIG. 2. The example partial reconfiguration controller 218 of FIG. 2 generates and/or identifies the licensed bitstream based on one or more input(s), selection(s), instruction(s) and/or command(s) provided to the partial reconfiguration controller 218 by the example licensed user 224 of the example user space 206 of FIG. 2. In some examples, the input(s), selection(s), instruction(s) and/or command(s) provided by the licensed user 224 of FIG. 2 may include an identification and/or selection of a bitstream (e.g., a base bitstream that may or may not be modifiable by the licensed user 224) that is accessible to the licensed user 224 from the example bitstream database 208 of FIG. 2 via the partial reconfiguration controller 218 of FIG. 2. In some examples, bitstreams available via the bitstream database 208 of FIG. 2 may be based on vendor-specific proprietary tools that enable the generation of design binaries for the bitstreams. The example licensed user 224 of FIG. 2 is authorized to program, configure, select, develop and/or otherwise make use of the licensed bitstream to be loaded into the configuration memory 210 of the example FPGA 202 of FIG. 2. In contrast, the example unlicensed user 226 of FIG. 2 is not authorized to program, configure, select, develop and/or otherwise make use of the licensed bitstream to be loaded into the example configuration memory 210 of the example FPGA 202 of FIG. 2.

In the illustrated example of FIG. 2, the licensed user tag(s) to be stored in the example tag memory 212 of the example FPGA 202 of FIG. 2 (e.g., the licensed user tag(s) associated with the licensed bitstream) is/are loaded into the tag memory 212 via the example partial reconfiguration controller 218 of the example kernel space 204 of FIG. 2. The example partial reconfiguration controller 218 of FIG. 2 generates and/or identifies the licensed user tag(s) based on one or more user identifier(s) (e.g., an individual user identifier, a group user identifier, etc.) provided to the partial reconfiguration controller 218 by the example licensed user 224 of the example user space 206 of FIG. 2. In some examples, the licensed user identifier(s) and/or, more generally, the licensed user tag(s) is/are unique to a specific user and/or a specific group of users who may be authorized and/or licensed to program, configure, select, develop and/or otherwise make use of the licensed bitstream to be loaded into the example configuration memory 210 of the example FPGA 202 of FIG. 2. In some examples, the partial reconfiguration controller 218 appends and/or embeds the licensed user tag(s) to and/or into a header of the licensed bitstream prior to the licensed bitstream being loaded into the configuration memory 210 of FIG. 2.

Figure 3:
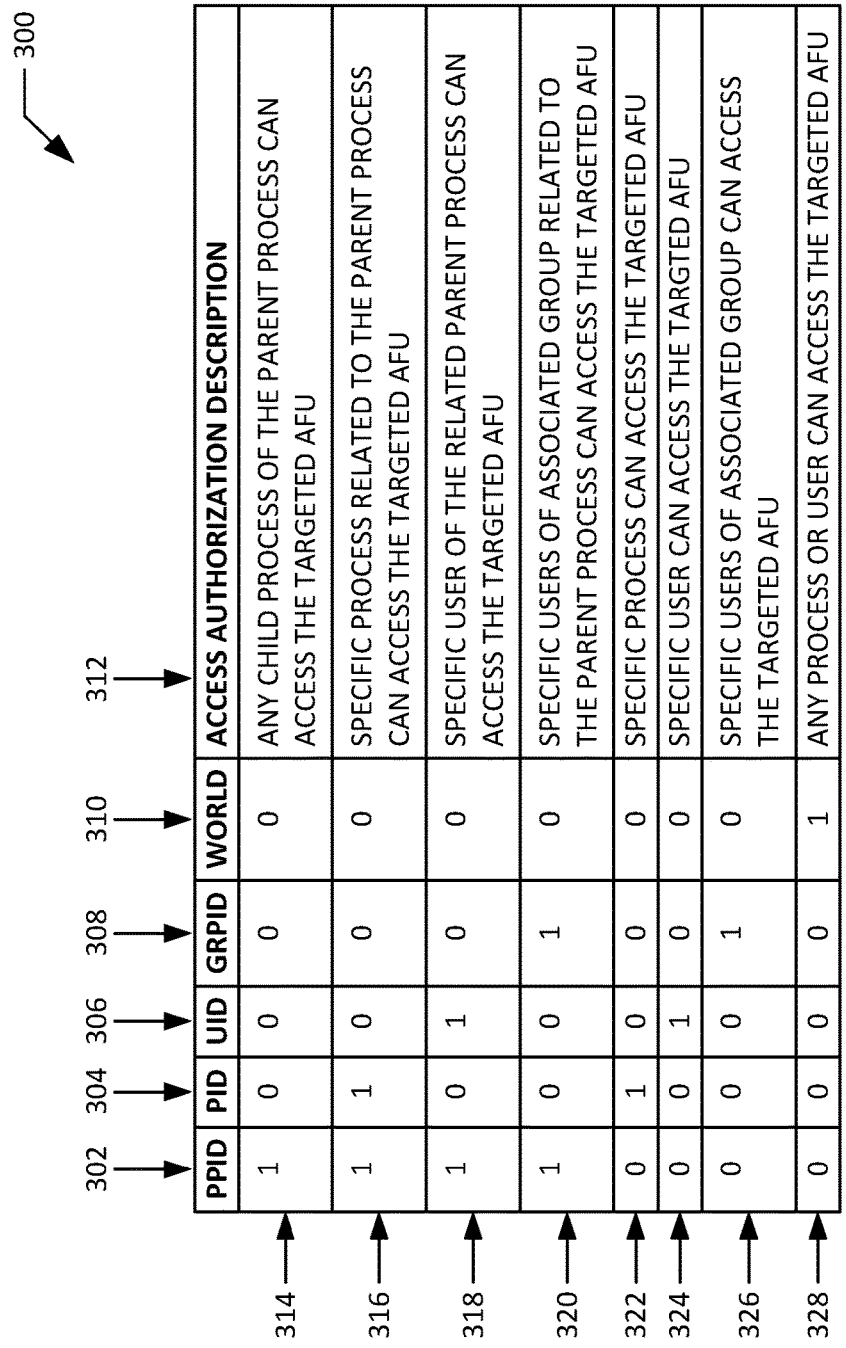
FIG. 3 illustrates an example access control correlation table that may be implemented in connection with providing user-level access authorization for the example FPGA of FIG. 2.

In some examples, the licensed user tag(s) may additionally include and/or additionally be based on access control metadata. In some examples, the access control metadata may be associated with one or more operating system properties of the example kernel space 204 and/or the example user space 206 of FIG. 2. In some examples, the access control metadata may include process tag information associated with a licensed user tag. FIG. 3 illustrates an example access control correlation table 300 that may be implemented in connection with providing user-level access authorization for the example FPGA 202 of FIG. 2.

In the illustrated example of FIG. 3, the access control correlation table 300 includes a first example access control attribute column 302, a second example access control attribute column 304, a third example access control attribute column 306, a fourth example access control attribute column 308, a fifth example access control attribute column 310, and an example access authorization description column 312. The first access control attribute column 302 of FIG. 3 is associated with a parent process identifier (PPID). The second access control attribute column 304 of FIG. 3 is associated with a process identifier (PID). The third access control attribute column 306 of FIG. 3 is associated with a user identifier (UID). The fourth access control attribute column 308 is associated with a group identifier (GRPID). The fifth access control attribute column 310 is associated with a world identifier (WORLD).

The access control correlation table 300 of FIG. 3 further includes a first example row of access control attribute code values 314, a second example row of access control attribute code values 316, a third example row of access control attribute code values 318, a fourth example row of access control attribute code values 320, a fifth example row of access control attribute code values 322, a sixth example row of access control attribute code values 324, a seventh example row of access control attribute code values 326, and an eighth example row of access control attribute code values 328. In the illustrated example of FIG. 3, a code value of "1" indicated that the associated attribute is active, while a code value of "0" indicates that the associated attribute is inactive. Different combinations and/or sequences of code values appearing in respective ones of the above-described rows of access control attribute code values 314, 316, 318, 320, 322, 324, 326, 328 of the access control correlation table 300 of FIG. 3 may be indicative of different levels and/or extents of access authorization to be associated with a user.

For example, as indicated by the access authorization description column 312 of FIG. 3 and the first row of access control attribute code values 314, a positive coding (e.g., a value of "1" as opposed to a value of "0") for only the PPID attribute of the first access control attribute column 302 indicates that any child process of a parent process can access a targeted accelerator functional unit (AFU) of the example FPGA 202 of FIG. 2 associated with performing one or more computational operation(s) and/or function(s)

based on the licensed bitstream stored in the example configuration memory 210 of FIG. 2. As indicated by the access authorization description column 312 of FIG. 3 and the second row of access control attribute code values 316, a positive coding for only the PPID attribute of the first access control attribute column 302 and the PID attribute of the second access control attribute column 304 indicates that a specific process related to the parent process can access the targeted AFU of the example FPGA 202 of FIG. 2. As indicated by the access authorization description column 312 of FIG. 3 and the third row of access control attribute code values 318, a positive coding for only the PPID attribute of the first access control attribute column 302 and the UID attribute of the third access control attribute column 306 indicates that a specific user of the related parent process can access the targeted AFU of the example FPGA 202 of FIG. 2. As indicated by the access authorization description column 312 of FIG. 3 and the fourth row of access control attribute code values 320, a positive coding for only the PPID attribute of the first access control attribute column 302 and the GRPID attribute of the fourth access control attribute column 308 indicates that the specific process of an associated group related to the parent process can access the targeted AFU of the example FPGA 202 of FIG. 2.

As indicated by the access authorization description column 312 of FIG. 3 and the fifth row of access control attribute code values 322, a positive coding for only the PID attribute of the second access control attribute column 304 indicates that a specific process can access the targeted AFU of the example FPGA 202 of FIG. 2. As indicated by the access authorization description column 312 of FIG. 3 and the sixth row of access control attribute code values 324, a positive coding for only the UID attribute of the third access control attribute column 306 indicates that a specific user can access the targeted AFU of the example FPGA 202 of FIG. 2. As indicated by the access authorization description column 312 of FIG. 3 and the seventh row of access control attribute code values 326, a positive coding for only the GRPID attribute of the fourth access control attribute column 308 indicates that the specific users of an associated group can access the targeted AFU of the example FPGA 202 of FIG. 2. As indicated by the access authorization description column 312 of FIG. 3 and the eighth row of access control attribute code values 328, a positive coding for only the WORLD attribute of the fifth access control attribute column 310 indicates that any process or any user can access the targeted AFU of the example FPGA 202 of FIG. 2.

Access control metadata (e.g. one or more code value(s) corresponding to one or more of the above-described access control attributes) may be associated with a user (e.g., the example licensed user 224 or the example unlicensed user 226 of FIG. 2). When such user-associated access control metadata is mapped and/or compared to the access control correlation table 300 of FIG. 3, a level and/or extent of access authorization associated with the user may be identified. For example, if a user is associated with access control metadata having a PPID code value of "0", a PID code value of "0", a UID code value of "1", a GRPID code value of "0", and a WORLD code value of "0", the access control correlation table 300 of FIG. 3 may indicate that the user can access a targeted AFU of the example FPGA 202 of FIG. 2 associated with performing one or more computational operation(s) and/or function(s) based on the licensed bitstream stored in the example configuration memory 210 of FIG. 2. Such access control metadata may be included as part of the above-described licensed user tag(s).

Returning to the illustrated example of FIG. 2, one or more users of the example user space 206 of FIG. 2 may attempt to access and/or use the example FPGA 202 of FIG. 2 via the example application 222 of the user space 206 subsequent to the FPGA 202 being programmed and/or configured via the above-described licensed bitstream. For example, either of the example licensed user 224 or the example unlicensed user 226 of FIG. 2 may execute the application 222 of FIG. 2. When executed by either of the licensed user 224 or the unlicensed user 226, the example application 222 of FIG. 2 generates one or more command (s) that request(s) and/or call(s) for access to and/or use of the example FPGA 202 of FIG. 2. The example application 222 of FIG. 2 sends the FPGA-related access and/or use command(s) to the example FPGA driver 220 of the example kernel space 204 of FIG. 2.

The example FPGA driver 220 of FIG. 2 generates and/or identifies one or more user tag(s) associated with the FPGA-related access and/or use command(s) based on one or more user identifier(s) (e.g., an individual user identifier, a group user identifier, etc.) provided to the FPGA driver 220 by the example application 222 of the example user space 206 FIG. 2, and/or by the user (e.g., the licensed user 224 or the unlicensed user 226 of FIG. 2) that instructed and/or caused the example application 222 of the example user space 206 of FIG. 2 to generate the FPGA-related access and/or use command(s). In some examples, the user tag(s) may additionally include and/or be based on access control metadata such as the example access control metadata described above in connection with FIG. 3. In some examples, the FPGA driver 220 of FIG. 2 appends and/or embeds the user tag(s) to and/or into a header of the FPGA-related access and/or use command(s).

In the illustrated example of FIG. 2, the user tag(s) generated and/or identified by the example FPGA driver 220 of FIG. 2 will match one or more of the licensed user tag(s) stored in the example tag memory 212 of FIG. 2 when the user that instructed and/or caused the example application 222 of FIG. 2 to generate the FPGA-related access and/or use command(s) is a licensed user (e.g., the licensed user 224 of FIG. 2). In contrast, the user tag(s) generated and/or identified by the example FPGA driver 220 of FIG. 2 will not match any of the licensed user tag(s) stored in the example tag memory 212 of FIG. 2 when the user that instructed and/or caused the example application 222 of FIG. 2 to generate the FPGA-related access and/or use command(s) is an unlicensed user (e.g., the unlicensed user 226 of FIG. 2).

In the illustrated example of FIG. 2, the example FPGA driver 220 of FIG. 2 implements and/or invokes a user-level access authorization process (e.g., a user tag matching process) associated with providing access to and/or use of the example FPGA 202 of FIG. 2. In some examples, the FPGA driver 220 implements and/or invokes the user-level access authorization process in response to receiving the above-described FPGA-related access and/or use command (s) from the example application 222 of FIG. 2. In other examples, the FPGA driver 220 implements and/or invokes the user-level access authorization process in response to generating and/or identifying the above-described user tag (s) associated with the above-described FPGA-related access and/or use command(s).

In some examples, the user-level access authorization process implemented and/or invoked via the example FPGA driver 220 of FIG. 2 may be a software-based process. In such examples, a tag matching operation and/or function of the user-level access authorization process may be implemented at the example kernel space 204 of FIG. 2 via the example FPGA driver 220 of FIG. 2. For example, in response to identifying the above-described FPGA-related access and/or use command(s) and the associated user tag(s), the example FPGA driver 220 of FIG. 2 may access and/or read the licensed user tag(s) stored in the example tag memory 212 of FIG. 2. In some such examples, the FPGA driver 220 may access the licensed user tag(s) from the tag memory 212 via the example control/status register 214 of FIG. 2.

In some examples where the tag matching operation and/or function of the user-level access authorization process is implemented at the example kernel space 204 of FIG. 2, the example FPGA driver 220 of FIG. 2 compares the user tag(s) associated with the FPGA-related access and/or use commands to the licensed user tag(s) accessed from the tag memory 212 of FIG. 2. If the FPGA driver 220 of FIG. 2 determines that one or more of the user tag(s) match one or more of the licensed user tag(s), the FPGA driver 220 accepts the FPGA-related access and/or use command(s) and sends the FPGA-related access and/or use command(s) to the example control/status register 214 of the FPGA 202 of FIG. 2. In such examples, the control/status register 214 of FIG. 2 provides an interface between the example FPGA 202 of FIG. 2 and the example FPGA driver 220 of FIG. 2, and also facilitates access to and/or use of the FPGA 202 for the purpose of implementing one or more computational operation(s) and/or function(s) associated with the licensed bitstream stored in the example configuration memory 210 of FIG. 2.

If the FPGA driver 220 of FIG. 2 instead determines that none of the user tag(s) match any of the licensed user tag(s), the FPGA driver 220 rejects the FPGA-related access and/or use command(s) and does not send the FPGA-related access and/or use command(s) to the control/status register 214 of the FPGA 202 of FIG. 2. In some examples in which the FPGA driver 220 of FIG. 2 rejects the FPGA-related access and/or use command(s), the FPGA driver 220 may send a denied access notification to the example application 222 of FIG. 2 to notify the application 222 that access to and/or use of the FPGA 202 of FIG. 2 has been denied. Thus, the FPGA driver 220 of FIG. 2 provides user-level access authorization for the FPGA 202 of FIG. 2 in connection with determining whether a user associated with the application 222 of FIG. 2 and/or the above-described FPGA-related access and/or use command(s) is an unlicensed user (e.g., the unlicensed user 226 of FIG. 2) versus a licensed user (e.g., the licensed user 224 of FIG. 2).

In other examples, the user-level access authorization process implemented and/or invoked via the example FPGA driver 220 of FIG. 2 may be a hardware-based process. In such other examples, a tag matching operation and/or function of the user-level access authorization process may be implemented at the example FPGA 202 of FIG. 2 via the example tag controller 216 of FIG. 2. For example, in response to identifying the above-described FPGA-related access and/or use command(s) and the associated user tag(s), the example FPGA driver 220 of FIG. 2 may send the FPGA-related access and/or use command(s) and the associated user tag(s) to the example control/status register 214 of the example FPGA 202 of FIG. 2, which in turn may provide the FPGA-related access and/or use command(s), and/or the associated user tag(s), to the example tag controller 216 of the example FPGA 202 of FIG. 2. In such examples, the control/status register 214 of FIG. 2 provides an interface between the example tag controller 216 of the FPGA 202 of FIG. 2 and the example FPGA driver 220 of the kernel space 204 of FIG. 2. In response to receiving and/or identifying the FPGA-related access and/or use command(s), and/or the associated user tag(s), the example tag controller 216 of FIG. 2 may access and/or read the licensed user tag(s) stored in the example tag memory 212 of FIG. 2.

In some examples where the tag matching operation and/or function of the user-level access authorization process is implemented at the example FPGA 202 of FIG. 2, the example tag controller 216 of FIG. 2 compares the user tag(s) associated with the FPGA-related access and/or use commands to the licensed user tag(s) accessed from the tag memory 212 of FIG. 2. If the tag controller 216 of FIG. 2 determines that one or more of the user tag(s) match one or more of the licensed user tag(s), the tag controller 216 accepts the FPGA-related access and/or use command(s). In such examples, the tag controller 216 also facilitates access to and/or use of the FPGA 202 for the purpose of implementing one or more computational operation(s) and/or function(s) associated with the licensed bitstream stored in the example configuration memory 210 of FIG. 2. In some examples in which the tag controller 216 of FIG. 2 accepts the FPGA-related access and/or use command(s), the tag controller 216 may send a granted access notification to the example FPGA driver 220 of FIG. 2 to notify the FPGA driver 220 that access to and/or use of the FPGA 202 of FIG. 2 has been granted.

If the tag controller 216 of FIG. 2 instead determines that none of the user tag(s) match any of the licensed user tag(s), the tag controller 216 rejects the FPGA-related access and/or use command(s). In such examples, the tag controller 216 does not allow access to and/or use of the FPGA 202 for the purpose of implementing one or more computational operation(s) and/or function(s) associated with the licensed bitstream stored in the example configuration memory 210 of FIG. 2. In some examples in which the tag controller 216 of FIG. 2 rejects the FPGA-related access and/or use command (s), the tag controller 216 may send a denied access notification to the example FPGA driver 220 of FIG. 2 to notify the FPGA driver 220 that access to and/or use of the FPGA 202 of FIG. 2 has been denied. In some such examples, the FPGA driver 220 may send the denied access notification to the example application 222 of FIG. 2 to notify the application 222 that access to and/or use of the FPGA 202 of FIG. 2 has been denied. Thus, the tag controller 216 of FIG. 2 provides user-level access authorization for the FPGA 202 of FIG. 2 in connection with determining whether a user associated with the application 222 of FIG. 2 and/or the above-described FPGA-related access and/or use command (s) is an unlicensed user (e.g., the unlicensed user 226 of FIG. 2) versus a licensed user (e.g., the licensed user 224 of FIG. 2).

In some examples, the example tag controller 216 of FIG. 2 may be implemented as a Joint Test Action Group (JTAG) controller. In some such examples, the tag controller 216 of FIG. 2 may be in direct communication with the example FPGA driver 220 of FIG. 2 (e.g., as indicated by the dotted line of FIG. 2 extending between the tag controller 216 and the FPGA driver 220) such that communications between the tag controller 216 and the FPGA driver 220 need not pass through the example control/status register 214 of FIG. 2. For example, in response to identifying the above-described FPGA-related access and/or use command(s) and the associated user tag(s), the FPGA driver 220 may send the FPGA-related access and/or use command(s) and the associated user tag(s) directly to the tag controller 216 (e.g., bypassing the control/status register 214), and the tag controller 216 may thereafter perform the example tag matching operation and/or function described above. In some examples, the tag controller 216 may send results from the tag matching operation and/or function (e.g., a granted access notification or a denied access notification) directly to the FPGA driver 220 (e.g., bypassing the control/status register 214).

While an example manner of implementing the example cloud computing environment 200 to provide user-level access authorization for the example FPGA 202 is illustrated in FIG. 2, one or more of the elements, processes and/or devices illustrated in FIG. 2 may be combined, divided, re-arranged, omitted, eliminated and/or implemented in any other way. Further, the example configuration memory 210, the example tag memory 212, the example control/status register 214, the example tag controller 216, the example partial reconfiguration controller 218, and/or the example FPGA driver 220 of FIG. 2 may be implemented by hardware, software, firmware and/or any combination of hardware, software and/or firmware. Thus, for example, any of the example configuration memory 210, the example tag memory 212, the example control/status register 214, the example tag controller 216, the example partial reconfiguration controller 218, and/or the example FPGA driver 220 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration memory 210, the example tag memory 212, the example control/status register 214, the example tag controller 216, the example partial reconfiguration controller 218, and/or the example FPGA driver 220 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cloud computing environment 200 of FIG. 2 to provide user-level access authorization for the example FPGA 202 of FIG. 2 may include one or more elements, processes and/or devices in addition to, or instead of, those illustrated in FIG. 2, and/or may include more than one of any or all of the illustrated elements, processes and devices.

Figure 4:
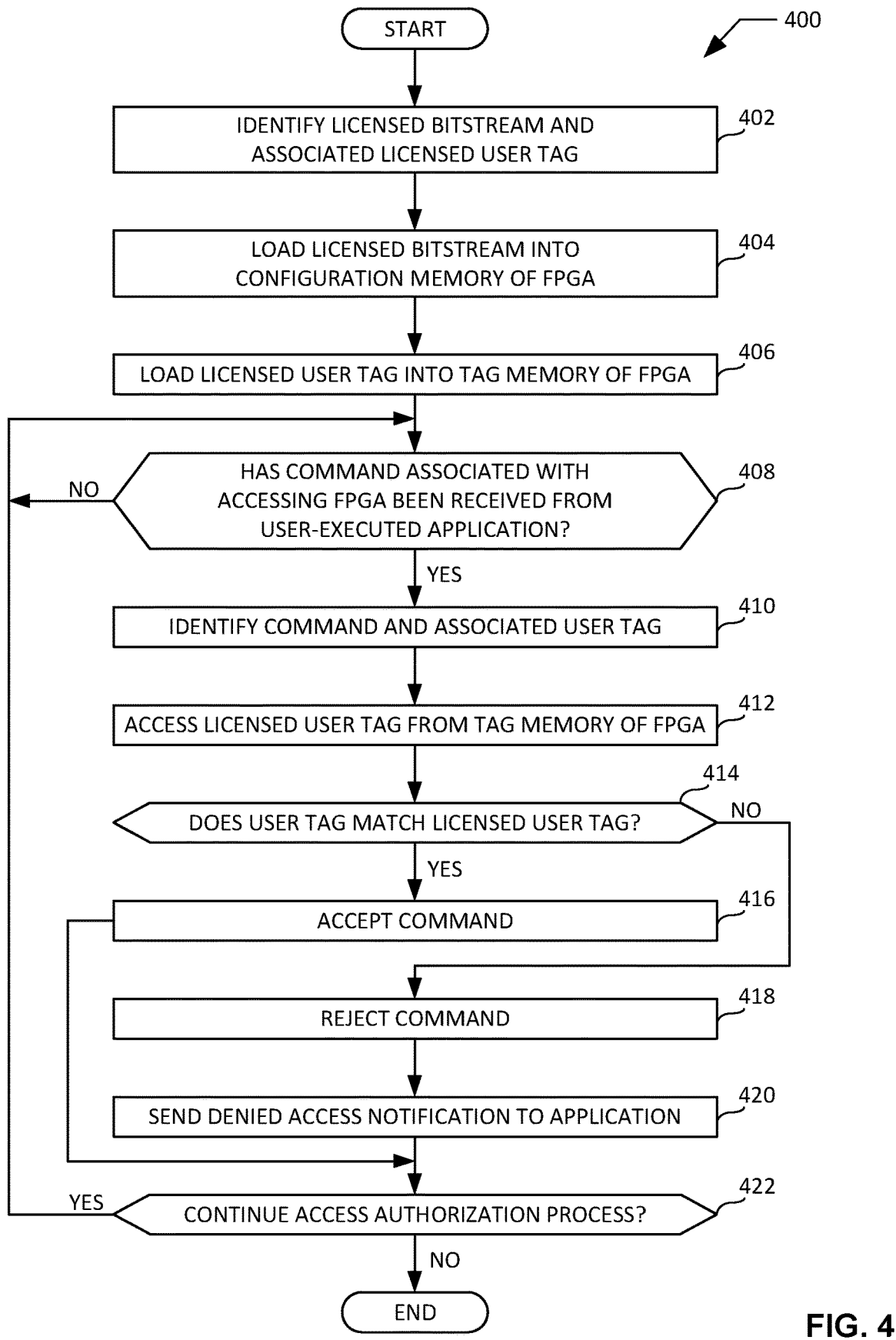
FIG. 4 is a flowchart representative of example machine readable instructions that may be executed at the example kernel space of the example computing environment of FIG. 2 to implement software-based user-level access authorization for the example FPGA of FIG. 2.
Figure 5:
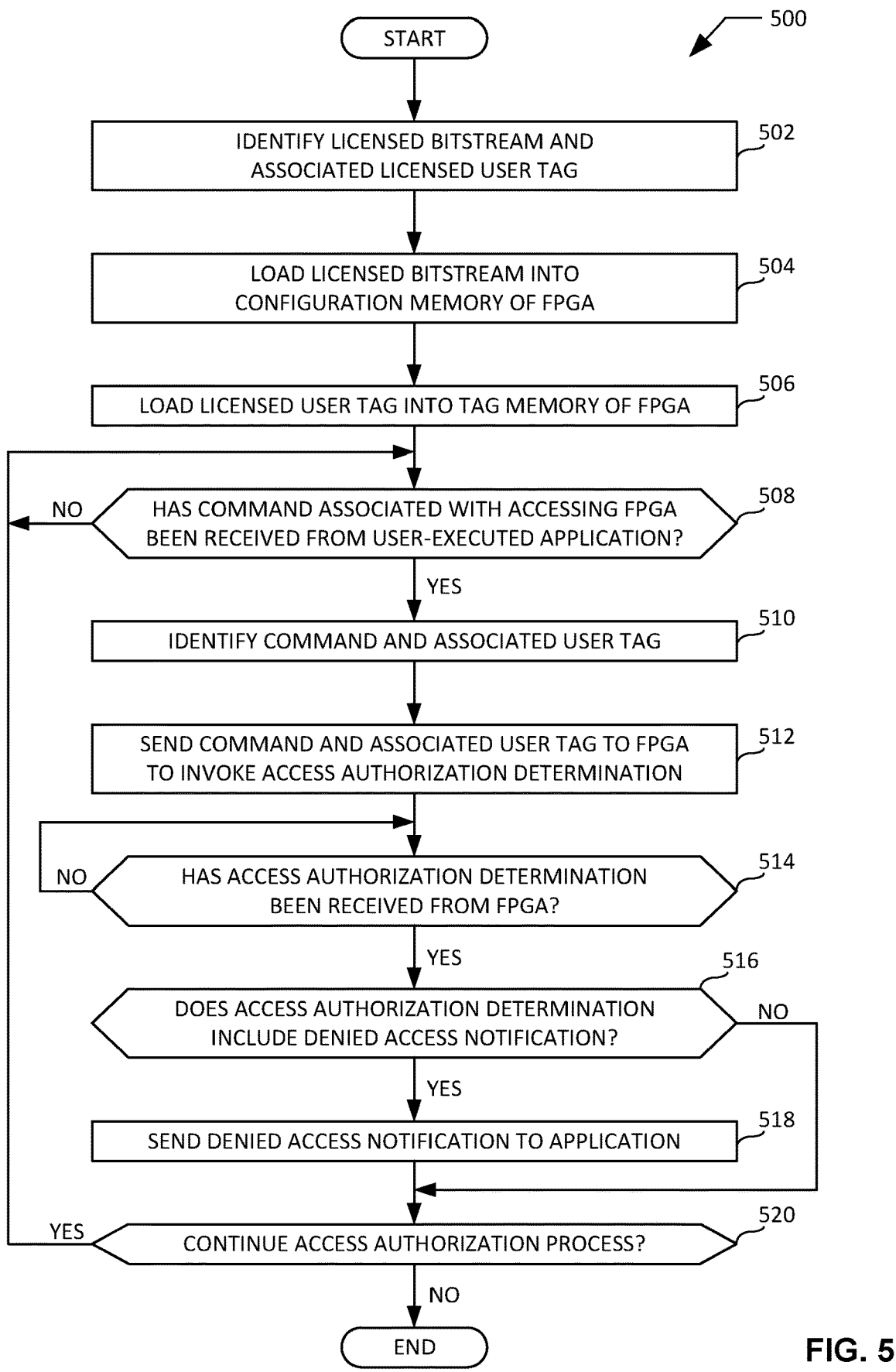
FIG. 5 is a flowchart representative of example machine readable instructions that may be executed at the example kernel space of the example computing environment of FIG. 2 to implement hardware-based user-level access authorization for the example FPGA of FIG. 2.
Figure 6:
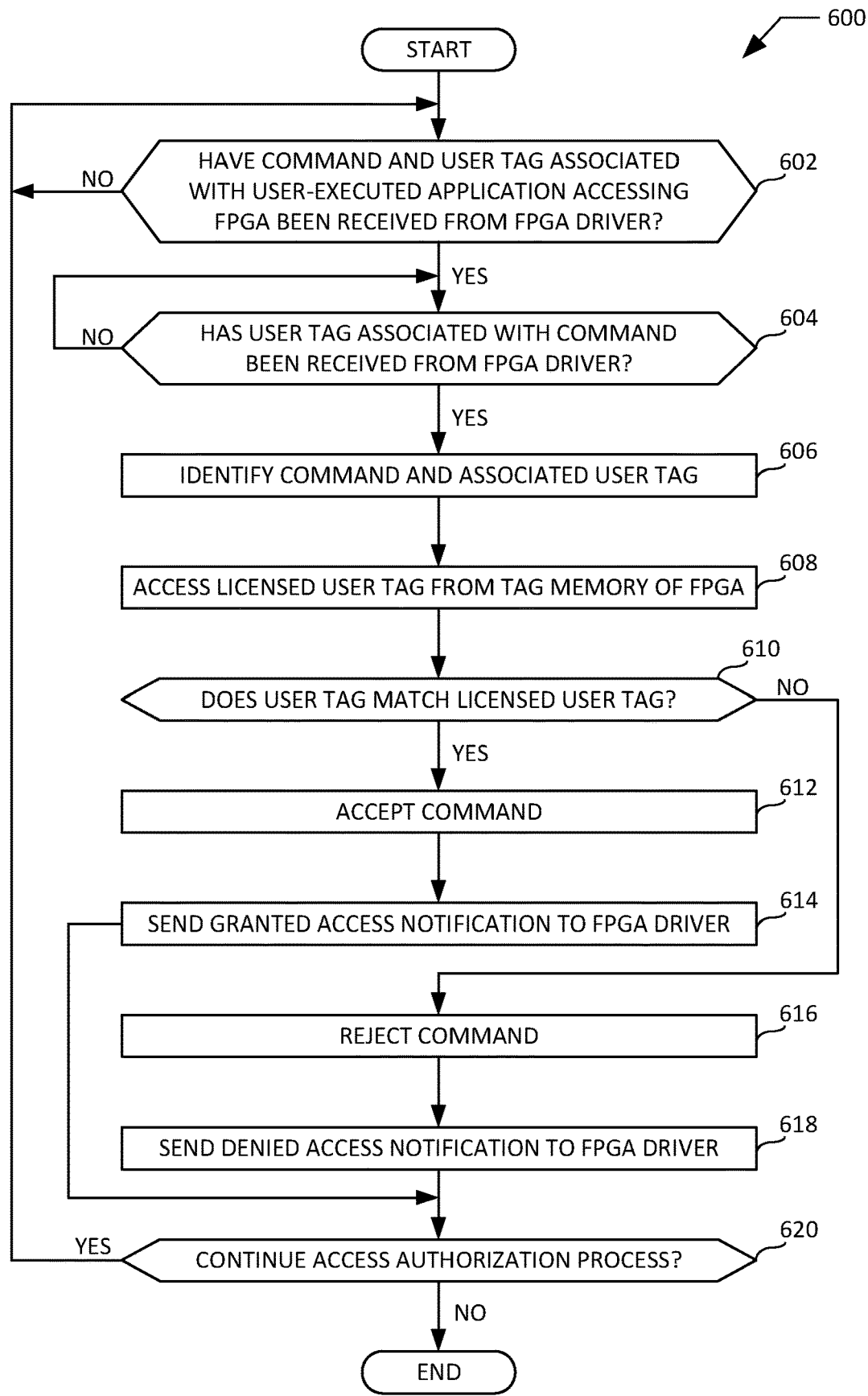
FIG. 6 is a flowchart representative of example machine readable instructions that may be executed at the example FPGA of the example computing environment of FIG. 2 to implement hardware-based user-level access authorization for the example FPGA of FIG. 2.

Flowcharts representative of example machine readable instructions for implementing user-level access authorization for the example FPGA 202 of FIG. 2 are shown in FIGS. 4-6. In these examples, the machine readable instructions comprise one or more program(s) for execution by one or more processor(s) such as the processor 702 shown in the example processor platform 700 discussed below in connection with FIG. 7. Each program may be embodied in software stored on a non-transitory computer readable storage medium such as a CD-ROM, a floppy disk, a hard drive, a digital versatile disk (DVD), a Blu-ray disk, or a memory associated with the processor 702, but the entirety of any program and/or parts thereof could alternatively be executed by a device other than the processor 702 and/or embodied in firmware or dedicated hardware. Further, although the example program(s) is/are described with reference to the flowcharts illustrated in FIGS. 4-6, many other methods of implementing user-level access authorization for the example FPGA 202 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 4 is a flowchart representative of example machine readable instructions 400 that may be executed at the example kernel space 204 of the example cloud computing environment 200 of FIG. 2 to implement software-based user-level access authorization for the example FPGA 202 of FIG. 2. The example program 400 of FIG. 4 begins when the example partial reconfiguration controller 218 of FIG. 2 identifies a licensed bitstream and a licensed user tag associated with the licensed bitstream (block 402). For example, the partial reconfiguration controller 218 may identify and/or generate a licensed bitstream based on one or more input(s), selection(s), instruction(s) and/or command(s) provided to the partial reconfiguration controller 218 by the example licensed user 224 of FIG. 2, and may further identify and/or generate a licensed user tag associated with the licensed bitstream based on one or more user identifier(s) (e.g., an individual user identifier, a group user identifier, etc.) provided to the partial reconfiguration controller 218 by the licensed user 224. Following block 402, control of the example program 400 of FIG. 4 proceeds to block 404.

At block 404, the example partial reconfiguration controller 218 of FIG. 2 loads the licensed bitstream into the example configuration memory 210 of the example FPGA 202 of FIG. 2 (block 404). Following block 404, control of the example program 400 of FIG. 4 proceeds to block 406.

At block 406, the example partial reconfiguration controller 218 of FIG. 2 loads the licensed user tag into the example tag memory 212 of the example FPGA 202 of FIG. 2 (block 406). Following block 406, control of the example program 400 of FIG. 4 proceeds to block 408.

At block 408, the example FPGA driver 220 of FIG. 2 determines whether a command associated with accessing and/or using the example FPGA 202 of FIG. 2 has been received from a user-executed application (block 408). For example, the FPGA driver 220 may determine that an FPGA-related access and/or use command has been received from the example application 222 of FIG. 2 as executed by the example licensed user 224 of FIG. 2 or by the example unlicensed user 226 of FIG. 2. If the FPGA driver 220 determines at block 408 that a command associated with accessing and/or using the example FPGA 202 of FIG. 2 has not been received from a user-executed application, control of the example program 400 of FIG. 4 remains at block 408. If the FPGA driver 220 instead determines at block 408 that a command associated with accessing and/or using the example FPGA 202 of FIG. 2 has been received from a user-executed application, control of the example program 400 of FIG. 4 proceeds to block 410.

At block 410, the example FPGA driver 220 of FIG. 2 identifies the command and a user tag associated with the command (block 410). For example, the FPGA driver 220 may identify the FPGA-related access and/or use command received from the example application 222 of FIG. 2, and may further identify and/or generate a user tag associated with the FPGA-related access and/or use command based on one or more user identifier(s) (e.g., an individual user identifier, a group user identifier, etc.) provided to the FPGA driver 220 by the application 222, and/or by the user (e.g., the licensed user 224 or the unlicensed user 226 of FIG. 2) that instructed and/or caused the application 222 to generate the FPGA-related access and/or use command. Following block 410, control of the example program 400 of FIG. 4 proceeds to block 412.

At block 412, the example FPGA driver 220 of FIG. 2 accesses the licensed user tag from the example tag memory 212 of FIG. 2 (block 412). For example, the FPGA driver 220 may access the licensed user tag from the tag memory 212 via the example control/status register 214 of the example FPGA 202 of FIG. 2. Following block 412, control of the example program 400 of FIG. 4 proceeds to block 414.

At block 414, the example FPGA driver 220 of FIG. 2 determines whether the user tag matches the licensed user tag (block 414). For example, the FPGA driver 220 may compare the user tag to the licensed user tag to determine if a match exists. If the FPGA driver 220 determines at block 414 that the user tag matches the licensed user tag, control of the example program 400 of FIG. 4 proceeds to block 416. If the FPGA driver 220 instead determines at block 414 that the user tag does not match the licensed user tag, control of the example program 400 of FIG. 4 proceeds to block 418.

At block 416, the example FPGA driver 220 of FIG. 2 accepts the command (block 416). For example, the FPGA driver 220 may accept the command and send the accepted command to the example control/status register 214 of the example FPGA 202 of FIG. 2 to facilitate access to and/or use of the FPGA 202 via the accepted command for the purpose of implementing one or more computational operation(s) and/or function(s) associated with the licensed bitstream stored in the example configuration memory 210 of the FPGA 202 of FIG. 2. Following block 416, control of the example program 400 of FIG. 4 proceeds to block 422.

At block 418, the example FPGA driver 220 of FIG. 2 rejects the command (block 418). For example, the FPGA driver 220 may reject the command and prevent the rejected command from being sent to the example control/status register 214 of the example FPGA 202 of FIG. 2 such that implementation of one or more computational operation(s) and/or function(s) associated with the licensed bitstream stored in the example configuration memory 210 of the FPGA 202 of FIG. 2 is prevented. Following block 418, control of the example program 400 of FIG. 4 proceeds to block 420.

At block 420, the example FPGA driver 220 of FIG. 2 sends a denied access notification to the user-executed application from which the FPGA driver 220 received the command (block 420). For example, the FPGA driver 220 may send a denied access notification to the example application 222 of FIG. 2 from which the FPGA driver 220 received the FPGA-related access and/or use command based on execution of the application 222 by the example unlicensed user 226 of FIG. 2. Following block 420, control of the example program 400 of FIG. 4 proceeds to block 422.

At block 422, the example FPGA driver 220 of FIG. 2 determines whether to continue the user-level access authorization process (block 422). For example, the FPGA driver 220 may receive one or more instruction(s) indicating that the user-level access authorization process is to be discontinued. If the FPGA driver 220 determines at block 422 that the user-level access authorization process is to continue, control of the example program 400 of FIG. 4 returns to block 408. If the FPGA driver 220 instead determines at block 422 that the user-level access authorization process is not to continue (e.g., that the process is to be discontinued), the example program 400 of FIG. 4 ends.

FIG. 5 is a flowchart representative of example machine readable instructions 500 that may be executed at the example kernel space 204 of the example cloud computing environment 200 of FIG. 2 to implement hardware-based user-level access authorization for the example FPGA 202 of FIG. 2. The example program 500 of FIG. 5 begins when the example partial reconfiguration controller 218 of FIG. 2 identifies a licensed bitstream and a licensed user tag associated with the licensed bitstream (block 502). For example, the partial reconfiguration controller 218 may identify and/or generate a licensed bitstream based on one or more input(s), selection(s), instruction(s) and/or command(s) provided to the partial reconfiguration controller 218 by the example licensed user 224 of FIG. 2, and may further identify and/or generate a licensed user tag associated with the licensed bitstream based on one or more user identifier(s) (e.g., an individual user identifier, a group user identifier, etc.) provided to the partial reconfiguration controller 218 by the licensed user 224. Following block 502, control of the example program 500 of FIG. 5 proceeds to block 504.

At block 504, the example partial reconfiguration controller 218 of FIG. 2 loads the licensed bitstream into the example configuration memory 210 of the example FPGA 202 of FIG. 2 (block 504). Following block 504, control of the example program 500 of FIG. 5 proceeds to block 506.

At block 506, the example partial reconfiguration controller 218 of FIG. 2 loads the licensed user tag into the example tag memory 212 of the example FPGA 202 of FIG. 2 (block 506). Following block 506, control of the example program 500 of FIG. 5 proceeds to block 508.

At block 508, the example FPGA driver 220 of FIG. 2 determines whether a command associated with accessing and/or using the example FPGA 202 of FIG. 2 has been received from a user-executed application (block 508). For example, the FPGA driver 220 may determine that an FPGA-related access and/or use command has been received from the example application 222 of FIG. 2 as executed by the example licensed user 224 of FIG. 2 or by the example unlicensed user 226 of FIG. 2. If the FPGA driver 220 determines at block 508 that a command associated with accessing and/or using the example FPGA 202 of FIG. 2 has not been received from a user-executed application, control of the example program 500 of FIG. 5 remains at block 508. If the FPGA driver 220 instead determines at block 508 that a command associated with accessing and/or using the example FPGA 202 of FIG. 2 has been received from a user-executed application, control of the example program 500 of FIG. 5 proceeds to block 510.

At block 510, the example FPGA driver 220 of FIG. 2 identifies the command and a user tag associated with the command (block 510). For example, the FPGA driver 220 may identify the FPGA-related access and/or use command received from the example application 222 of FIG. 2, and may further identify and/or generate a user tag associated with the FPGA-related access and/or use command based on one or more user identifier(s) (e.g., an individual user identifier, a group user identifier, etc.) provided to the FPGA driver 220 by the application 222, and/or by the user (e.g., the licensed user 224 or the unlicensed user 226 of FIG. 2) that instructed and/or caused the application 222 to generate the FPGA-related access and/or use command. Following block 510, control of the example program 500 of FIG. 5 proceeds to block 512.

At block 512, the example FPGA driver 220 of FIG. 2 sends the command and the associated user tag to the example FPGA 202 of FIG. 2 to invoke an access authorization determination at the FPGA 202 (block 512). For example, the FPGA driver 220 may send the command and associated user tag to the example control/status register 214 of the FPGA 202 of FIG. 2 to invoke an access authorization determination at the example tag controller 216 of the FPGA 202 of FIG. 2. Following block 512, control of the example program 500 of FIG. 5 proceeds to block 514.

At block 514, the example FPGA driver 220 of FIG. 2 determines whether an access authorization determination has been received from the example FPGA 202 of FIG. 2 (block 514). For example, the FPGA driver 220 may receive an access authorization determination from the example control/status register 214 and/or the example tag controller 216 of the FPGA 202 in response to the FPGA driver 220 having sent the command and the associated user tag to the FPGA 202 at block 512. If the FPGA driver 220 determines at block 514 that an access authorization determination has not been received from the FPGA 202, control of the example program 500 of FIG. 5 remains at block 514. If the FPGA driver 220 instead determines at block 514 that an access authorization determination has been received from the FPGA 202, control of the example program 500 of FIG. 5 proceeds to block 516.

At block 516, the example FPGA driver 220 of FIG. 2 determines whether the access authorization determination received from the example FPGA 202 of FIG. 2 includes a denied access notification (block 516). If the FPGA driver 220 determines at block 516 that the access authorization determination includes a denied access notification, control of the example program 500 of FIG. 5 proceeds to block 518. If the FPGA driver 220 instead determines at block 516 that the access authorization determination does not include a denied access notification, control of the example program 500 of FIG. 5 proceeds to block 520.

At block 518, the example FPGA driver 220 of FIG. 2 sends the denied access notification to the user-executed application from which the FPGA driver 220 received the command (block 518). For example, the FPGA driver 220 may send the denied access notification to the example application 222 of FIG. 2 from which the FPGA driver 220 received the FPGA-related access and/or use command based on execution of the application 222 by the example unlicensed user 226 of FIG. 2. Following block 518, control of the example program 500 of FIG. 5 proceeds to block 520.

At block 520, the example FPGA driver 220 of FIG. 2 determines whether to continue the user-level access authorization process (block 520). For example, the FPGA driver 220 may receive one or more instruction(s) indicating that the user-level access authorization process is to be discontinued. If the FPGA driver 220 determines at block 520 that the user-level access authorization process is to continue, control of the example program 500 of FIG. 5 returns to block 508. If the FPGA driver 220 instead determines at block 520 that the user-level access authorization process is not to continue (e.g., that the process is to be discontinued), the example program 500 of FIG. 5 ends.

FIG. 6 is a flowchart representative of example machine readable instructions 600 that may be executed at the example FPGA 202 of the example cloud computing environment 200 of FIG. 2 to implement hardware-based user-level access authorization for the example FPGA 202 of FIG. 2. The example program 600 of FIG. 6 begins when the example FPGA 202 of FIG. 2 determines whether a command associated with a user-executed application accessing and/or using the example FPGA 202 of FIG. 2 has been received from the example FPGA driver 220 of FIG. 2 (block 602). For example, the example control/status register 214 and/or the example tag controller 216 of the FPGA 202 of FIG. 2 may determine that an FPGA-related access and/or use command associated with the example application 222 of FIG. 2 as executed by the example licensed user 224 of FIG. 2 or by the example unlicensed user 226 of FIG. 2 has been received from the FPGA driver 220. If the FPGA 202 determines at block 602 that a command associated with a user-executed application accessing and/or using the FPGA 202 has not been received from the FPGA driver 220, control of the example program 600 of FIG. 6 remains at block 602. If the FPGA 202 instead determines at block 602 that a command associated with a user-executed application accessing and/or using the FPGA 202 has been received from the FPGA driver 220, control of the example program 600 of FIG. 6 proceeds to block 604.

At block 604, the example FPGA 202 of FIG. 2 determines whether a user tag associated with the command has been received from the example FPGA driver 220 of FIG. 2 (block 604). For example, the example control/status register 214 and/or the example tag controller 216 of the FPGA 202 of FIG. 2 may determine that a user tag associated with the FPGA-related access and/or use command has been received from the FPGA driver 220. If the FPGA 202 determines at block 604 that a user tag associated with the command has not been received from the FPGA driver 220, control of the example program 600 of FIG. 6 remains at block 604. If the FPGA 202 instead determines at block 604 that a user tag associated with the command has been received from the FPGA driver 220, control of the example program 600 of FIG. 6 proceeds to block 606.

At block 606, the example FPGA 202 of FIG. 2 identifies the command and the associated user tag (block 606). For example, the example control/status register 214 and/or the example tag controller 216 of the FPGA 202 of FIG. 2 may identify the command and the associated user tag received from the example FPGA driver 220 of FIG. 2. Following block 606, control of the example program 600 of FIG. 6 proceeds to block 608.

At block 608, the example tag controller 216 of FIG. 2 accesses the licensed user tag from the example tag memory 212 of FIG. 2 (block 608). For example, the tag controller 216 may access and/or read the licensed user tag directly from the tag memory 212. Following block 608, control of the example program 600 of FIG. 6 proceeds to block 610.

At block 610, the example tag controller 216 of FIG. 2 determines whether the user tag matches the licensed user tag (block 610). For example, the tag controller 216 may compare the user tag to the licensed user tag to determine if a match exists. If the tag controller 216 determines at block 610 that the user tag matches the licensed user tag, control of the example program 600 of FIG. 6 proceeds to block 612. If the tag controller 216 instead determines at block 610 that the user tag does not match the licensed user tag, control of the example program 600 of FIG. 6 proceeds to block 616.

At block 612, the example tag controller 216 of FIG. 2 accepts the command (block 612). For example, the tag controller 216 may accept the command and facilitate access to and/or use of the example FPGA 202 of FIG. 2 via the accepted command for the purpose of implementing one or more computational operation(s) and/or function(s) associated with the licensed bitstream stored in the example configuration memory 210 of the FPGA 202 of FIG. 2. Following block 612, control of the example program 600 of FIG. 6 proceeds to block 614.

At block 614, the example tag controller 216 of FIG. 2 sends a granted access notification to the example FPGA driver 220 of FIG. 2 (block 614). For example, the tag controller 216 may send and/or return an access authorization determination including a granted access notification to the FPGA driver 220 to notify the FPGA driver 220 that access to and/or use of the example FPGA 202 of FIG. 2 has been granted. Following block 614, control of the example program 600 of FIG. 6 proceeds to block 620.

At block 616, the example tag controller 216 of FIG. 2 rejects the command (block 616). For example, the tag controller 216 may reject the command and prevent access to and/or use of the example FPGA 202 of FIG. 2 via the rejected command such that implementation of one or more computational operation(s) and/or function(s) associated with the licensed bitstream stored in the example configuration memory 210 of the FPGA 202 of FIG. 2 is prevented. Following block 616, control of the example program 600 of FIG. 6 proceeds to block 618.

At block 618, the example tag controller 216 of FIG. 2 sends a denied access notification to the example FPGA driver 220 of FIG. 2 (block 618). For example, the tag controller 216 may send and/or return an access authorization determination including a denied access notification to the FPGA driver 220 to notify the FPGA driver 220 that access to and/or use of the example FPGA 202 of FIG. 2 has been denied. Following block 618, control of the example program 600 of FIG. 6 proceeds to block 620.

At block 620, the example FPGA 202 of FIG. 2 determines whether to continue the user-level access authorization process (block 620). For example, the example control/status register 214 and/or the example tag controller 216 of the FPGA 202 of FIG. 2 may receive one or more instruction(s) indicating that the user-level access authorization process is to be discontinued. If the FPGA 202 determines at block 620 that the user-level access authorization process is to continue, control of the example program 600 of FIG. 6 returns to block 602. If the FPGA 202 instead determines at block 620 that the user-level access authorization process is not to continue (e.g., that the process is to be discontinued), the example program 600 of FIG. 6 ends.

Figure 7:
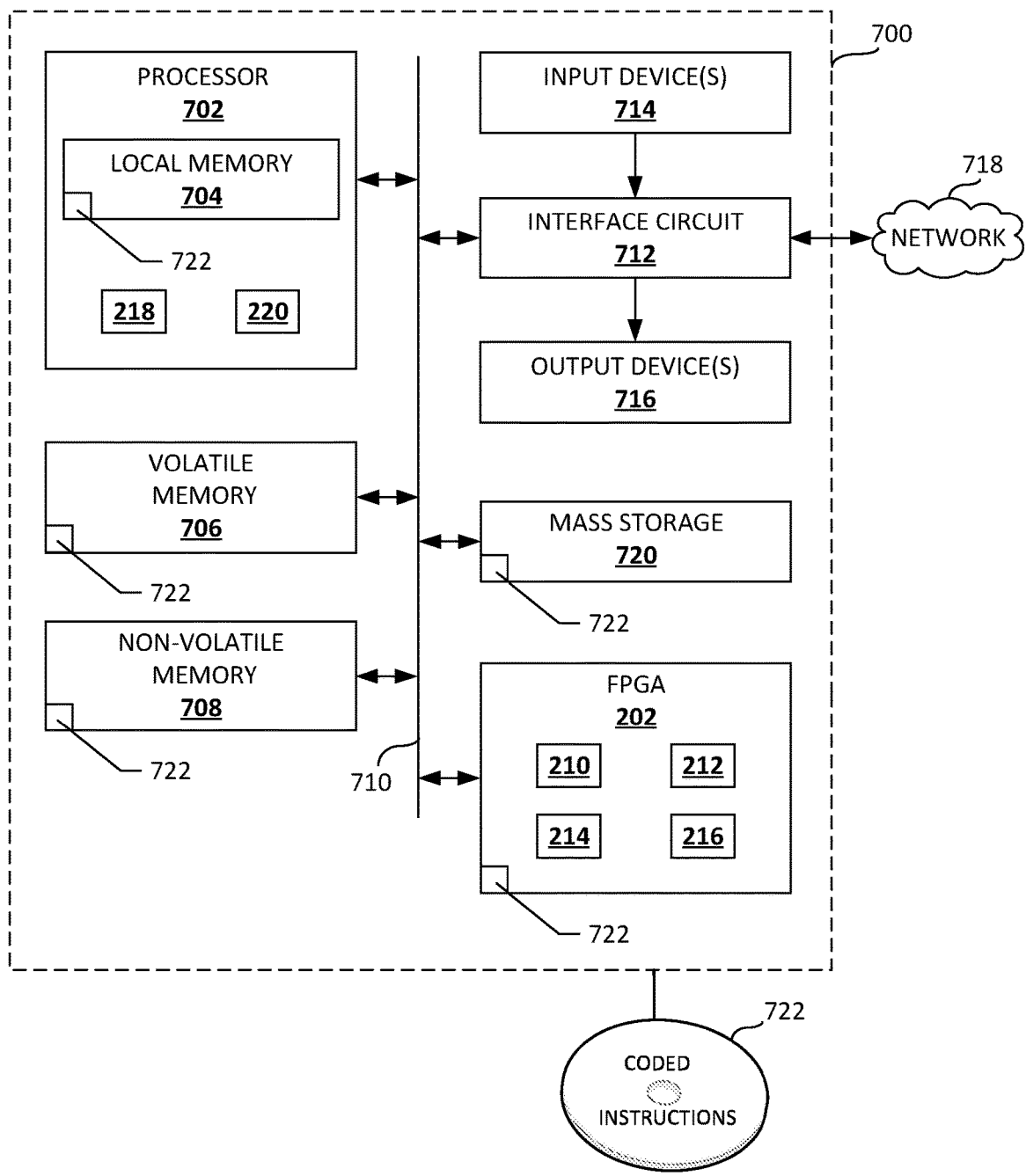
FIG. 7 is an example processor platform capable of executing the instructions of FIGS. 4-6 to implement user-level access authorization for the example FPGA of FIG. 2.

FIG. 7 is a block diagram of an example processor platform 700 capable of executing the example instructions of FIGS. 4-6 to implement user-level access authorization for the example FPGA 202 of FIG. 2. The processor platform 700 can be, for example, a server, a personal computer, a laptop computer, a mobile device (e.g., a cell phone, a smart phone, a tablet such as an iPad™), or any other type of computing device.

The processor platform 700 of the illustrated example includes a processor 702. The processor 702 of the illustrated example is hardware. For example, the processor 702 can be implemented by one or more integrated circuits, logic circuits, microprocessors or controllers from any desired family or manufacturer. The hardware processor 702 may be a semiconductor based (e.g., silicon based) device. In the example of FIG. 7, the processor 702 implements the example partial reconfiguration controller 218 and the example FPGA driver 220 of FIG. 2. The processor 702 of the illustrated example also includes a local memory 704 (e.g., a cache).

The processor 702 of the illustrated example is in communication with a main memory including a volatile memory 706 and a non-volatile memory 708 via a bus 710. The volatile memory 706 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 708 may be implemented by flash memory and/or any other desired type of memory device. Access to the main memory 706, 708 is controlled by a memory controller.

The processor platform 700 of the illustrated example also includes an interface circuit 712. The interface circuit 712 may be implemented by any type of interface standard, such as an Ethernet interface, a universal serial bus (USB), and/or a PCI express interface.

In the illustrated example, one or more input device(s) 714 are connected to the interface circuit 712. The input device(s) 714 permit(s) a user to enter data and/or commands into the processor 702. The input device(s) 714 can be implemented by, for example, an audio sensor, a microphone, a camera (still or video), a keyboard, a button, a mouse, a touchscreen, a track-pad, a trackball, isopoint and/or a voice recognition system.

One or more output device(s) 716 are also connected to the interface circuit 712 of the illustrated example. The output device(s) 716 can be implemented, for example, by display devices (e.g., a light emitting diode (LED), an organic light emitting diode (OLED), a liquid crystal display, a cathode ray tube display (CRT), a projector, a touchscreen, a tactile output device, a printer and/or speakers). The interface circuit 712 of the illustrated example, thus, typically includes a graphics driver card, a graphics driver chip and/or a graphics driver processor.

The interface circuit 712 of the illustrated example also includes a communication device such as a transmitter, a receiver, a transceiver, a modem and/or network interface card to facilitate exchange of data with external machines (e.g., computing devices of any kind) via a network 718 (e.g., an Ethernet connection, a digital subscriber line (DSL), a telephone line, coaxial cable, a cellular telephone system, etc.).

The processor platform 700 of the illustrated example also includes one or more mass storage device(s) 720 for storing software and/or data. Examples of such mass storage devices 720 include floppy disk drives, hard drive disks, compact disk drives, Blu-ray disk drives, RAID systems, and digital versatile disk (DVD) drives.

The processor 702 of the illustrated example is also in communication with the example FPGA 202 of FIG. 2 via the bus 710. In the illustrated example of FIG. 7, the FPGA 202 includes the example configuration memory 210, the example tag memory 212, the example control/status register 214, and the example tag controller 216 of FIG. 2.

Coded instructions 722 corresponding to the program(s) of FIGS. 4-6 may be stored in the local memory 704, in the volatile memory 706, in the non-volatile memory 708, in the mass storage device 720, in the FPGA 202, and/or on a removable tangible computer readable storage medium such as a CD or DVD.

From the foregoing, it will be appreciated that example methods and apparatus have been disclosed to provide user-level access authorization for cloud-based FPGAs. The disclosed methods and apparatus advantageously reduce (e.g., limit and/or prevent) the possibility of an unauthorized and/or unlicensed user accessing and/or using a cloud-based FPGA that has been programmed and/or configured based on a licensed bitstream. The disclosed methods and apparatus accordingly provide increased protection to vendors' rights and/or developers' rights in licensed bitstreams loaded into cloud-based FPGAs. Such increased protection encourages the continued adoption and implementation of cloud-based FPGAs as computational accelerators.

Although the above-described examples are directed primarily toward providing user-level access authorization for cloud-based FPGAs, the aforementioned advantages of the disclosed methods and apparatus may also be extended to cloud-based computational accelerators other than FPGAs. For example, the disclosed methods and apparatus to provide user-level access authorization may also be applied to and/or implemented via cloud-based graphical processing units (GPUs), cloud-based Many Integrated Core circuits (MICs), and/or other types of cloud-based computational accelerators.

Furthermore, although the above-described examples are directed primarily toward providing user-level access authorization, the aforementioned advantages of the disclosed methods and apparatus may also be extended to other types of data tags to be implemented in connection with one or more additional or alternative access authorization methods, schemes and/or protocols. For example, one or more process tag(s) associated with a licensed bitstream may be loaded into a read-write accessible segment of memory of a cloud-based FPGA, and may thereafter be implemented to provide process-level access authorization for the FPGA in a manner that is similar to above-described user-level access authorization methods, schemes and/or protocols.

In some examples, an apparatus is disclosed. In some disclosed examples, the apparatus comprises a field-programmable gate array (FPGA) including a first memory and a second memory different from the first memory. In some disclosed examples, the first memory is to store a bitstream. In some disclosed examples, the second memory is to store a first user tag associated with the bitstream. In some disclosed examples, the apparatus further comprises a kernel having an FPGA driver operatively coupled to the FPGA. In some disclosed examples, the FPGA driver is to receive a command associated with accessing the FPGA from a user-executed application. In some disclosed examples, the FPGA driver is to identify a second user tag associated with the command. In some disclosed examples, the FPGA driver is to determine whether the command is to be accepted based on the second user tag.

In some disclosed examples of the apparatus, the first memory is a write-only random access memory and the second memory is a read-write random access memory. In some disclosed examples, the first user tag includes a user identifier and access control metadata associated with the user identifier.

In some disclosed examples of the apparatus, the kernel further includes a partial reconfiguration controller operatively coupled to the first memory and the second memory of the FPGA. In some disclosed examples, the partial reconfiguration controller is to load the bitstream into the first memory and to load the first user tag into the second memory.

In some disclosed examples of the apparatus, the FPGA driver is to access the first user tag from the second memory of the FPGA. In some disclosed examples, the FPGA driver is to determine whether the second user tag matches the first user tag. In some disclosed examples, the FPGA driver is to accept the command in response to determining that the second user tag matches the first user tag.

In some disclosed examples of the apparatus, the FPGA driver is to reject the command in response to determining that the second user tag does not match the first user tag. In some disclosed examples, the FPGA driver is to send a denied access notification to the user-executed application in response to rejecting the command.

In some disclosed examples of the apparatus, the FPGA driver is to send the command and the second user tag to the FPGA. In some disclosed examples, the FPGA further includes a tag controller. In some disclosed examples, the tag controller is to access the first user tag from the second memory of the FPGA. In some disclosed examples, the tag controller is to determine whether the second user tag matches the first user tag. In some disclosed examples, the tag controller is to accept the command in response to determining that the second user tag matches the first user tag. In some disclosed examples, the tag controller is to send a granted access notification to the FPGA driver in response to accepting the command.

In some disclosed examples, the tag controller is to reject the command in response to determining that the second user tag does not match the first user tag. In some disclosed examples, the tag controller is to send a denied access notification to the FPGA driver in response to rejecting the command. In some disclosed examples, the FPGA driver is to send the denied access notification to the user-executed application.

In some examples, a non-transitory computer readable storage medium comprising instructions is disclosed. In some disclosed examples, the instructions, when executed, cause one or more processors to load a bitstream into a first memory of a field-programmable gate array (FPGA). In some disclosed examples, the instructions, when executed, cause the one or more processors to load a first user tag into a second memory of the FPGA different from the first memory. In some disclosed examples, the first user tag is associated with the bitstream. In some disclosed examples, the instructions, when executed, cause the one or more processors to identify a command associated with accessing the FPGA received from a user-executed application. In some disclosed examples, the instructions, when executed, cause the one or more processors to identify a second user tag associated with the command. In some disclosed examples, the instructions, when executed, cause the one or more processors to determine whether the command is to be accepted based on the second user tag.

In some disclosed examples of the non-transitory computer readable storage medium, the first memory is a write-only random access memory and the second memory is a read-write random access memory. In some disclosed examples, the first user tag includes a user identifier and access control metadata associated with the user identifier. In some disclosed examples, the first memory is to store the bitstream and the second memory is to store the first user tag.

In some disclosed examples, the instructions, when executed, cause the one or more processors to access the first user tag from the second memory of the FPGA. In some disclosed examples, the instructions, when executed, cause the one or more processors to determine whether the second user tag matches the first user tag. In some disclosed examples, the instructions, when executed, cause the one or more processors to accept the command in response to determining that the second user tag matches the first user tag.

In some disclosed examples, the instructions, when executed, cause the one or more processors to reject the command in response to determining that the second user tag does not match the first user tag. In some disclosed examples, the instructions, when executed, cause the one or more processors to send a denied access notification to the user-executed application in response to rejecting the command.

In some disclosed examples, the instructions, when executed, cause the one or more processors to send the command and the second user tag to the FPGA to invoke an access authorization determination to be implemented by the FPGA. In some disclosed examples, the access authorization determination to be implemented by the FPGA includes accessing the first user tag from the second memory of the FPGA. In some disclosed examples, the access authorization determination to be implemented by the FPGA includes determining whether the second user tag matches the first user tag. In some disclosed examples, the access authorization determination to be implemented by the FPGA includes accepting the command in response to determining that the second user tag matches the first user tag. In some disclosed examples, the access authorization determination to be implemented by the FPGA includes returning a granted access notification from the FPGA in response to accepting the command.

In some disclosed examples, the access authorization determination to be implemented by the FPGA includes rejecting the command in response to determining that the second user tag does not match the first user tag. In some disclosed examples, the access authorization determination to be implemented by the FPGA includes returning a denied access notification from the FPGA in response to rejecting the command.

In some examples, a method is disclosed. In some disclosed examples, the method comprises loading, by executing a computer readable instruction with one or more processors, a bitstream into a first memory of a field-programmable gate array (FPGA). In some disclosed examples, the method comprises loading, by executing a computer readable instruction with the one or more processors, a first user tag into a second memory of the FPGA different from the first memory. In some disclosed examples, the first user tag is associated with the bitstream. In some disclosed examples, the method comprises receiving a command associated with accessing the FPGA from a user-executed application. In some disclosed examples, the method comprises identifying, by executing a computer readable instruction with the one or more processors, a second user tag associated with the command. In some disclosed examples, the method comprises determining, by executing a computer readable instruction with the one or more processors, whether the command is to be accepted based on the second user tag.

In some disclosed examples of the method, the first memory is a write-only random access memory and the second memory is a read-write random access memory. In some disclosed examples, the first user tag includes a user identifier and access control metadata associated with the user identifier. In some disclosed examples, the first memory is to store the bitstream and the second memory is to store the first user tag.

In some disclosed examples, the method further includes accessing the first user tag from the second memory of the FPGA. In some disclosed examples, the method further includes determining whether the second user tag matches the first user tag. In some disclosed examples, the method further includes accepting the command in response to determining that the second user tag matches the first user tag.

In some disclosed examples, the method further includes rejecting the command in response to determining that the second user tag does not match the first user tag. In some disclosed examples, the method further includes sending a denied access notification to the user-executed application in response to rejecting the command.

In some disclosed examples, the method further includes sending the command and the second user tag to the FPGA to invoke an access authorization determination to be implemented by the FPGA. In some disclosed examples, the access authorization determination to be implemented by the FPGA includes accessing the first user tag from the second memory of the FPGA. In some disclosed examples, the access authorization determination to be implemented by the FPGA includes determining whether the second user tag matches the first user tag. In some disclosed examples, the access authorization determination to be implemented by the FPGA includes accepting the command in response to determining that the second user tag matches the first user tag. In some disclosed examples, the access authorization determination to be implemented by the FPGA includes returning a granted access notification from the FPGA in response to accepting the command.

In some disclosed examples, the access authorization determination to be implemented by the FPGA includes rejecting the command in response to determining that the second user tag does not match the first user tag. In some disclosed examples, the access authorization determination to be implemented by the FPGA includes returning a denied access notification from the FPGA in response to rejecting the command.

In some examples, an apparatus is disclosed. In some disclosed examples, the apparatus comprises a field-programmable gate array (FPGA) including a bitstream storage means for storing a bitstream, and a user tag storage means for storing a first user tag associated with the bitstream. In some disclosed examples, the apparatus further comprises a kernel having a driver means driver operatively coupled to the FPGA. In some disclosed examples, the driver means is to receive a command associated with accessing the FPGA from a user-executed application. In some disclosed examples, the driver means is to identify a second user tag associated with the command. In some disclosed examples, the driver means is to determine whether the command is to be accepted based on the second user tag.

In some disclosed examples of the apparatus, the bitstream storage means is a write-only random access memory and the user tag storage means is a read-write random access memory. In some disclosed examples, the first user tag includes a user identifier and access control metadata associated with the user identifier.

In some disclosed examples of the apparatus, the kernel further includes a partial reconfiguration means operatively coupled to the bitstream storage means and the user tag storage means of the FPGA. In some disclosed examples, the partial reconfiguration means is to load the bitstream into the bitstream storage means and to load the first user tag into the user tag storage means.

In some disclosed examples of the apparatus, the driver means is to access the first user tag from the user tag storage means of the FPGA. In some disclosed examples, the driver means is to determine whether the second user tag matches the first user tag. In some disclosed examples, the driver means is to accept the command in response to determining that the second user tag matches the first user tag.

In some disclosed examples of the apparatus, the driver means is to reject the command in response to determining that the second user tag does not match the first user tag. In some disclosed examples, the driver means is to send a denied access notification to the user-executed application in response to rejecting the command.

In some disclosed examples of the apparatus, the driver means is to send the command and the second user tag to the FPGA. In some disclosed examples, the FPGA further includes a controller means. In some disclosed examples, the controller means is to access the first user tag from the user tag storage means of the FPGA. In some disclosed examples, the controller means is to determine whether the second user tag matches the first user tag. In some disclosed examples, the controller means is to accept the command in response to determining that the second user tag matches the first user tag. In some disclosed examples, the controller means is to send a granted access notification to the driver means in response to accepting the command.

In some disclosed examples, the controller means is to reject the command in response to determining that the second user tag does not match the first user tag. In some disclosed examples, the controller means is to send a denied access notification to the driver means in response to rejecting the command. In some disclosed examples, the driver means is to send the denied access notification to the user-executed application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a field-programmable gate array (FPGA) including a first memory and a second memory different from the first memory;
a partial reconfiguration controller operatively coupled to the FPGA, the partial reconfiguration controller to:
generate a first user tag based on a first user identifier associated with a bitstream;
embed the first user tag into a header of the bitstream;
load the bitstream into the first memory of the FPGA; and
load the first user tag from the header of the bitstream into the second memory of the FPGA; and
an FPGA driver operatively coupled to the FPGA, the FPGA driver to:
receive a command associated with accessing the FPGA from a user-executed application;
generate a second user tag based on a second user identifier associated with the command; and
determine whether the command is to be accepted based on the second user tag.

2. The apparatus as defined in claim 1, wherein the first memory is a write-only random access memory and the second memory is a read-write random access memory.

3. The apparatus as defined in claim 1, wherein the first user tag includes access control metadata associated with the first user identifier.

4. The apparatus as defined in claim 1, wherein the FPGA driver is further to:
access the first user tag from the second memory of the FPGA;
determine whether the second user tag matches the first user tag; and
accept the command in response to determining that the second user tag matches the first user tag.

5. The apparatus as defined in claim 4, wherein the FPGA driver is further to:
reject the command in response to determining that the second user tag does not match the first user tag; and
send a denied access notification to the user-executed application in response to rejecting the command.

6. The apparatus as defined in claim 1, wherein the FPGA driver is further to:
embed the second user tag into a header of the command; and
send the command to the FPGA to invoke an access authorization determination to be implemented by the FPGA.

7. The apparatus as defined in claim 6, wherein the FPGA is to:
access the first user tag from the second memory of the FPGA;
access the second user tag from the header of the command;
determine whether the second user tag matches the first user tag;
accept the command in response to determining that the second user tag matches the first user tag; and
return a granted access notification to the FPGA driver in response to accepting the command.

8. The apparatus as defined in claim 7, wherein the FPGA is to:
reject the command in response to determining that the second user tag does not match the first user tag; and
return a denied access notification to the FPGA driver in response to rejecting the command, the FPGA driver to send the denied access notification to the user-executed application.

9. A non-transitory computer readable storage medium comprising instructions that, when executed, cause one or more processors to at least:
generate a first user tag based on a first user identifier associated with a bitstream;
embed the first user tag into a header of the bitstream;
load the bitstream into a first memory of a field-programmable gate array (FPGA) operatively coupled to the one or more processors;
load the first user tag from the header of the bitstream into a second memory of the FPGA different from the first memory;
identify a command associated with accessing the FPGA, the command from a user-executed application;
generate a second user tag based on a second user identifier associated with the command; and determine whether the command is to be accepted based on the second user tag.

10. The non-transitory computer readable storage medium as defined in claim 9, wherein the instructions, when executed, further cause the one or more processors to:
access the first user tag from the second memory of the FPGA;
determine whether the second user tag matches the first user tag; and
accept the command in response to determining that the second user tag matches the first user tag.

11. The non-transitory computer readable storage medium as defined in claim 10, wherein the instructions, when executed, further cause the one or more processors to:
reject the command in response to determining that the second user tag does not match the first user tag; and
send a denied access notification to the user-executed application in response to rejecting the command.

12. The non-transitory computer readable storage medium as defined in claim 9, wherein the instructions, when executed, further cause the one or more processors to:
embed the second user tag into a header of the command; and
send the command to the FPGA to invoke an access authorization determination to be implemented by the FPGA.

13. The non-transitory computer readable storage medium as defined in claim 12, wherein the FPGA is to implement the access authorization determination by:
accessing the first user tag from the second memory of the FPGA;
accessing the second user tag from the header of the command;
determining whether the second user tag matches the first user tag;
accepting the command in response to determining that the second user tag matches the first user tag; and
returning a granted access notification from the FPGA in response to accepting the command.

14. The non-transitory computer readable storage medium as defined in claim 13, wherein the FPGA is to implement the access authorization determination by:
rejecting the command in response to determining that the second user tag does not match the first user tag; and
returning a denied access notification from the FPGA in response to rejecting the command.

15. A method, comprising:
generating, by executing a computer readable instruction with one or more processors, a first user tag based on a first user identifier associated with a bitstream;
embedding, by executing a computer readable instruction with the one or more processors, the first user tag into a header of the bitstream;
loading, by executing a computer readable instruction with the one or more processors, the bitstream into a first memory of a field-programmable gate array (FPGA) addressable by the one or more processors;
loading, by executing a computer readable instruction with the one or more processors, the first user tag from the header of the bitstream into a second memory of the FPGA different from the first memory;
in response to a command associated with accessing the FPGA from a user-executed application, generating, by executing a computer readable instruction with the one or more processors, a second user tag based on a second user identifier associated with the command; and
determining, by executing a computer readable instruction with the one or more processors, whether the command is to be accepted based on the second user tag.

16. The method as defined in claim 15, further including:
accessing, by executing a computer readable instruction with the one or more processors, the first user tag from the second memory of the FPGA;
determining, by executing a computer readable instruction with the one or more processors, whether the second user tag matches the first user tag; and
accepting, by executing a computer readable instruction with the one or more processors, the command in response to determining that the second user tag matches the first user tag.

17. The method as defined in claim 16, further including:
rejecting, by executing a computer readable instruction with the one or more processors, the command in response to determining that the second user tag does not match the first user tag; and
sending, by executing a computer readable instruction with the one or more processors, a denied access notification to the user-executed application in response to rejecting the command.

18. The method as defined in claim 15, further including:
embedding, by executing a computer readable instruction with the one or more processors, the second user tag into a header of the command; and
sending, by executing a computer readable instruction with the one or more processors, the command to the FPGA to invoke an access authorization determination to be implemented by the FPGA.

19. The method as defined in claim 18, further including:
accessing the first user tag from the second memory of the FPGA;
accessing the second user tag from the header of the command;
determining whether the second user tag matches the first user tag;
accepting the command in response to determining that the second user tag matches the first user tag; and
returning a granted access notification from the FPGA in response to accepting the command.

20. The apparatus of claim 3, wherein the FPGA driver is to determine access privileges associated with the first user tag by comparing the access control metadata to an access control correlation table, the access control correlation table including one or more process authorization attributes and further including one or more user authorization attributes.

\* \* \* \* \*